April 5, 1966　　　K. N. BURNS　　　3,244,252
SEISMIC SOURCE

Filed March 19, 1962　　　3 Sheets-Sheet 1

KAY N. BURNS INVENTOR.

BY John D. Gassett
ATTORNEY

April 5, 1966    K. N. BURNS    3,244,252
SEISMIC SOURCE
Filed March 19, 1962    3 Sheets-Sheet 3

KAY N. BURNS INVENTOR.

BY John D. Gassett
ATTORNEY

United States Patent Office 3,244,252
Patented Apr. 5, 1966

3,244,252
SEISMIC SOURCE
Kay N. Burns, Tulsa, Okla., assignor to Esso Production Research Company, Houston, Tex., a corporation of Delaware
Filed Mar. 19, 1962, Ser. No. 180,505
4 Claims. (Cl. 181—.5)

This invention relates generally to the art of geophysical exploration using artificial seismic waves or disturbances. It is particularly concerned with an apparatus and system for generating seismic pulses of controlled shapes.

Geophysical prospecting using artificially induced seismic disturbances has found wide application in the search for petroleum and other products. It is the general practice to initiate a seismic disturbance at a point near the surface of the earth to direct seismic waves downward into the earth from that point. The waves continue to travel downward within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal. This seismic signal is in effect a composite signal made up of a plurality of electrical signals varying in frequency and amplitude.

The artificially induced seismic disturbances has most frequently been produced by initiating an explosion such as dynamite in a shot hole drilled in the surface of the earth. This has certain drawbacks including the hazard of handling the explosive and also the cost of such explosives and the cost of drilling the shot holes. Recently interest has been shown in the industry in mechanical type seismic transducers. One such mechanical device consists simply in raising a large mass a distance above the surface of the earth and dropping it; the force with which the weight or mass strikes the earth induces the seismic disturbance. This system although having some merit has a disadvantage of being difficult to transport because of its great weight. The methods of detonating an explosive and dropping a weight are both effective but the operator has almost no control over the amplitudes and phases of the frequency components which go to make up the down-travelling pulse. It is thus clear that there is a need for a relatively simple system in which a seismic pulse can be generated in which the frequency spectrum for a desirably shaped down-travelling pulse is known and can be controlled. Such a system is disclosed herein.

One signal that is desirable for a seismic pulse is expressed by Equation 1:

(1) $F(t) = A(t) \cos B(t)$

This invention provides means to control $A(t)$, the amplitude function, and $B(t)$, the frequency function. The control of $A(t)$ is developed by the proper phasing of two vertical sinusoidal motions so that they either add or partially cancel each other and therefore control the amplitude of the outgoing sinusoidal signal. The control of $B(t)$ or the frequency of the sinusoid is obtained by controlling the speed of the motor driving two sets of counter-rotating weights.

Briefly, the seismic generator of this invnetion includes a first pair and a second pair of counter-rotating weights. Means are provided to rotate each pair at the same frequency or alternatively at the same varying frequencies. Means are provided to selecitvely control the phase relationship of the two pairs of counter-rotating weights. When both pairs of rotating weights are rotating at $\omega_0$, changes in $\theta(t)$ (phase) give various amplitudes of force. By selecting the proper frequency or range of frequencies within a selected time, and by varying the phase of the two pairs of counter-rotating weights, it is thus seen then that, within the practical mechanical limitations of the system, desirable down-travelling wavelets can be generated.

A better understanding of this invention and the subject will be apparent from the following description taken in conjunction with the accompanying drawings in which.

Figure 1:
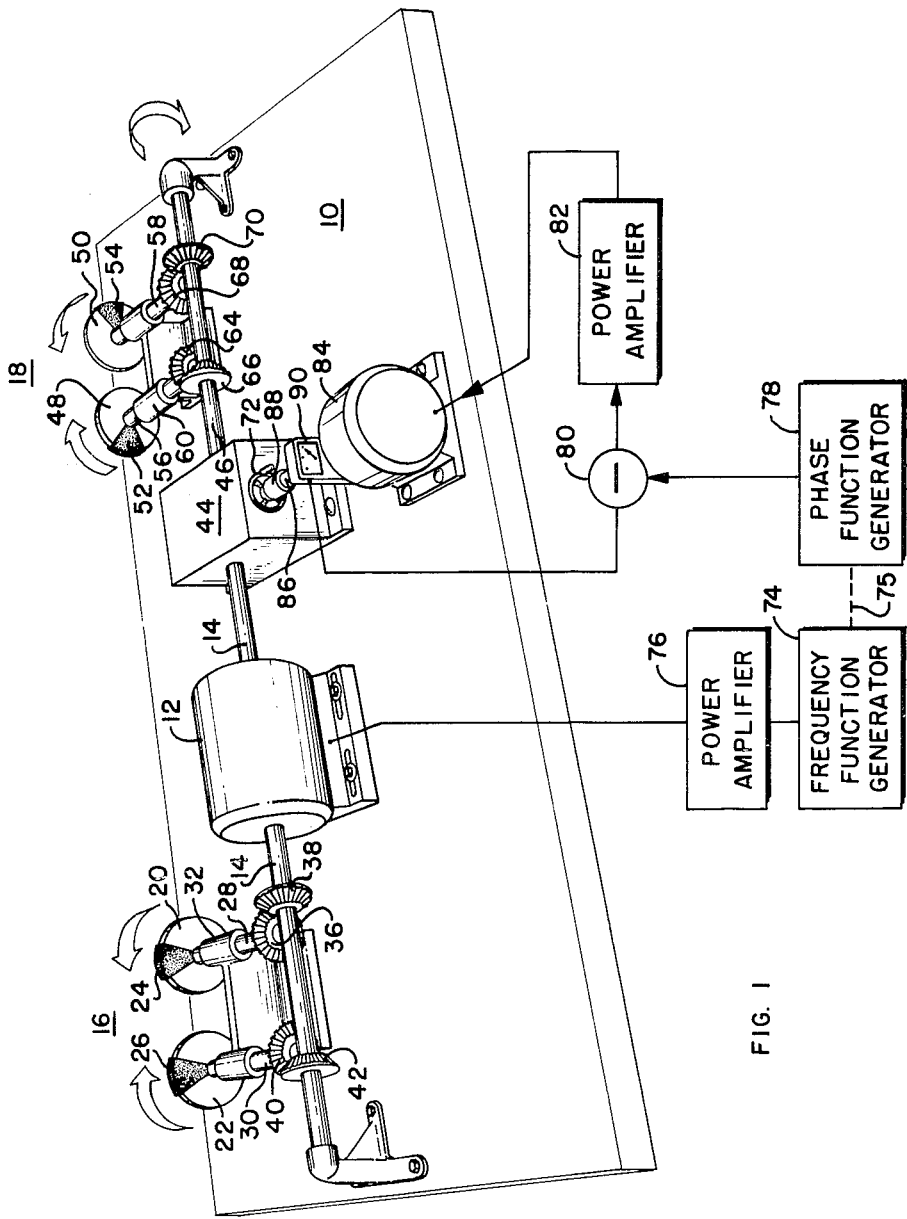
FIG. 1 illustrates in schematic form one embodiment of the seismic pulse generator.

Referring to the drawing and FIG. 1 in particular, there is illustrated a preferred embodiment of the best mode contemplated for carrying out the invention. Shown in FIG. 1 is a rigid base 10 upon which is mounted motor 12 having shaft 14 extending therethrough. Also supported from rigid base 10 is a first pair of counter-rotating weights 16 and a second pair 18. The first pair of counter-rotating weights 16 includes a first wheel 20 and a second wheel 22 upon which are mounted eccentric weights 24 and 26 respectively. Wheels 20 and 22 are supported such that they rotate in a plane perpendicular to the plane of base 10 (i.e. in a vertical plane) by horizontal shafts or axes 28 and 30 respectively. Shafts 28 and 30 are supported from base 10 by support 32.

Shaft 28 is provided with gear means 36 which mesh with gear means 38 of shaft 14. Shaft 30 is provided with gear means 40 which mesh with gear means 42 of shaft 14. Gear means 38 and 42 are arranged with respect to gear means 36 and 40 of shafts 28 and 30 such that the shafts 28 and 30 rotate in opposite directions for a common rotation of shaft 14. Thus, the shaft 14 and rotating wheels 22 and 20 rotate in the directions indicated by the arrows on the drawing.

Shaft 14 of motor 12 which extends in the opposite direction from the pair of counter-rotating weights 16 is connected to a differential gear mechanism 44 which has an output power shaft 46. Differential gear 44 is of a type which can change the phase of the rotation of shaft 46 with respect to shaft 14. Shaft 46 drives counter-rotating weights 18 similarly as described above in regard to shaft 14 and counter-rotating weights 16.

Counter-rotating weights 18 include wheels 48 and 50 upon which are mounted eccentric weights 52 and 54 respectively. Wheels 48 and 50 are supported on horizontal shafts 56 and 58 which are supported from rigid base 10 by support means 60. Shaft 56 has gear means 64 which mesh with gear means 66 of shaft 46. Likewise, shaft 58 has gear means 68 which mesh with gear means 70 of shaft 46. Gear means 66 and 70 mesh with the gears of shafts 56 and 58 on opposite sides so that shafts 56 and 58 will rotate in opposite directions.

In one operation of the device in FIG. 1 motor 12 is started and rotated at a selected frequency. Thus the control of the factor B(t) of Equation 1 is obtained. Counter-rotating weights 16 and 18 are 180° out of phase, thus there is no net vertical phase and the vibrator is in its idle condition until it is desired to generate a pulse. With motor 12 at its desired frequency, differential gear 44 is varied by hand wheel 72 to obtain the desired change in phase relationship. Thus, as will be explained more fully hereinafter, the control of the factor A(t) of Equation 1 is obtained. Hand wheel 72 can conveniently have an indicator thereon to indicate the phase relationship of shafts 14 and 46.

Also shown in FIG. 1 are means to pre-program a selected frequency function, B(t), for motor 12 and means to pre-program a phase function for the two sets or pairs of counter-rotating weights. The pre-programmed frequency system includes a frequency function generator 74 connected to a power amplifier 76 which drives motor 12. Frequency function generator 74 can, for example, be a magnetic tape upon which is recorded the desired frequency function. The frequency function is reproduced and properly modulated and fed to power amplifier 76 whose output drives motor 12 at a varying frequency to faithfully follow the output of frequency function generator 74.

Attention will now be directed toward that part of FIG. 1 in which a phase function can be incorporated to drive the differential gear 44. Illustrated in FIG. 1, is a phase function generator 78 which, like frequency function generator 74, can be recorded on a magnetic tape and reproduced. The phase function generator 78 is of a character to have an output voltage whose instantaneous amplitude is proportional to the desired phase relation at that particular instant. The output of phase function generator 78 is fed to a difference circuit 80. The output of difference circuit 80 is fed to power amplifier 82 which drives a motor 84. Motor 84 has a shaft 86 which is connected through coupling 88 to adjust differential gear 44. When it is desired to adjust differential gear 44 manually by use of indicating hand wheel 72, coupling 88 can be removed thus de-coupling shaft 86 from the differential box 44.

A position indicating means 90 is provided to be associated with shaft 86 to determine its shaft position. Indicating means 90 can conveniently be a potentiometer. The position indicator 90 has an output signal which is proportional to the rotational position of shaft 86. The output of position indicator 90 is fed to difference circuit 80. It is thus seen then that motor 84 is caused to rotate until the output of position indicating means 90 is equal to the output of the phase function generator 78. Thus the phase of rotating weights 18 and rotating weights 16 are adjusted faithfully as commanded by the pre-programmed output of phase function generator 78.

Figure 3:
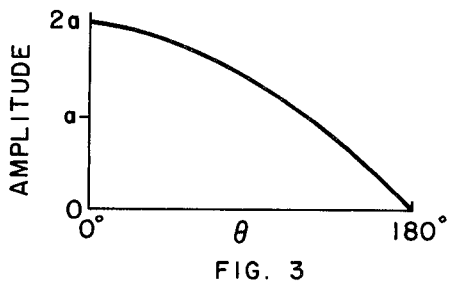
FIG. 3 illustrates the amplitude envelope for varying the phase from 0° to 180° of two pairs of counter-rotating weights.
Figure 4:
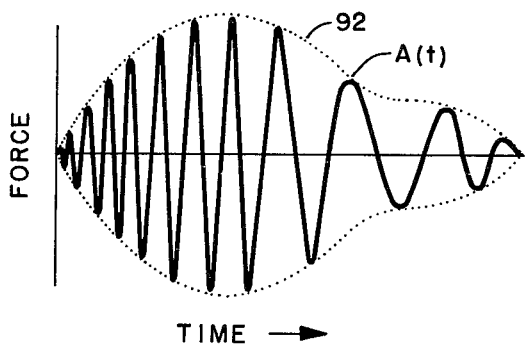
FIG. 4 illustrates a typical desired down-travelling wavelet.
Figure 5:
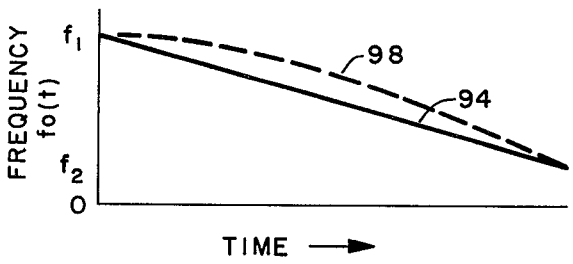
FIG. 5 illustrates one curve for varying the frequency of the wavelet of FIG. 4.
Figure 6:
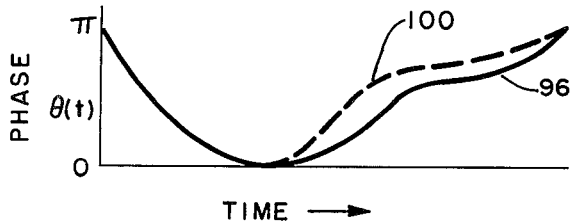
FIG. 6 illustrates a curve for varying the phase to obtain the envelope of the wavelet of FIG. 4.

Attention will now be directed to FIGS. 3, 4, 5 and 6 which illustrate a system for the proper programming of the frequency generator 74 and the phase function generator 78. It will be assumed that it is desired to generate an envelope as illustrated at 92 in FIG. 4 and which has a frequency ranging from $f_1$ to $f_2$ which can be for example from 100 to 10 cycles per second. In FIG. 5 the line 94 illustrates a frequency function varying linearly from $f_1$ to $f_2$. Turning now to FIG. 3, there is illustrated the amplitude of the envelope for a phase angle from 0° to 180°. This envelope amplitude is given by the formula $$\text{Amplitude} = 2a \cos \frac{\theta}{2}$$

where "$a$" is the peak amplitude from one set of counter-rotating weights. Then assuming that envelope 92 of FIG. 4 or A(t) is desired, then θ(t) is solved for enough points in time to obtain an essentially continuous curve 96 as shown in FIG. 6. θ(t) is obtained by solving the equation $\theta(t) = 2 \cos^{-1} A(t)2a$. The particular curves illustrated in FIGS. 4, 5 and 6 show that the higher frequencies are emphasized more than the lower frequencies. This may be one selected way of compensating for the fact that in the earth higher frequencies are apparently attenuated more than the lower frequencies. It will of course be understood that emphasis of various frequencies can be obtained by altering the frequency or phase control curves, such as illustrated in dotted line 98 and in dotted line 100.

It is believed that the operation of the embodiment in FIG. 1 is apparent from the above description of the apparatus itself. Briefly, a frequency function generator 74 is designed to have an output whose frequency varies with time as desired as illustrated above in regard to FIG. 5. It is, of course, understood that a constant frequency can be used over the period of the signal if desired. The output of frequency function generator 74 is fed to power amplifier 76 which drives motor 12 at the programmed frequency. Thus, counter-rotating sets of weights 16 and 18 are driven at the correct frequency. Synchronization of the frequency function generator 74 and the phase function generator 78 is accomplished by synchronized timing means 75 which, as illustrated, can be a shaft uniting the drive shafts of the transport means for the magnetic tapes on which the functions are recorded. The output of phase function generator 78 is used to drive motor 84 to position shaft 86, such that the output of indicating means 90 equals the output of phase function generator 78. The rotation of shaft 86 positions differential gear 44 to a position such that shaft 46 is in a selected phase in comparison to shaft 14 as directed by the output of phase function generator 78. Shaft 86 is continually positioned to very closely and faithfully follow the output of phase function generator 78. Thus the frequency of the first set of counter-rotating weights 16 has its phase constantly adjusted in relationship with the second set of counter-rotating weights 18. Thus a seismic signal is imparted to the ground upon which base 10 rests which has a frequency which is controlled by the output of frequency function generator 74 and whose amplitude or envelope of the frequency function is controlled by the output of phase function generator 78.

Figure 2:
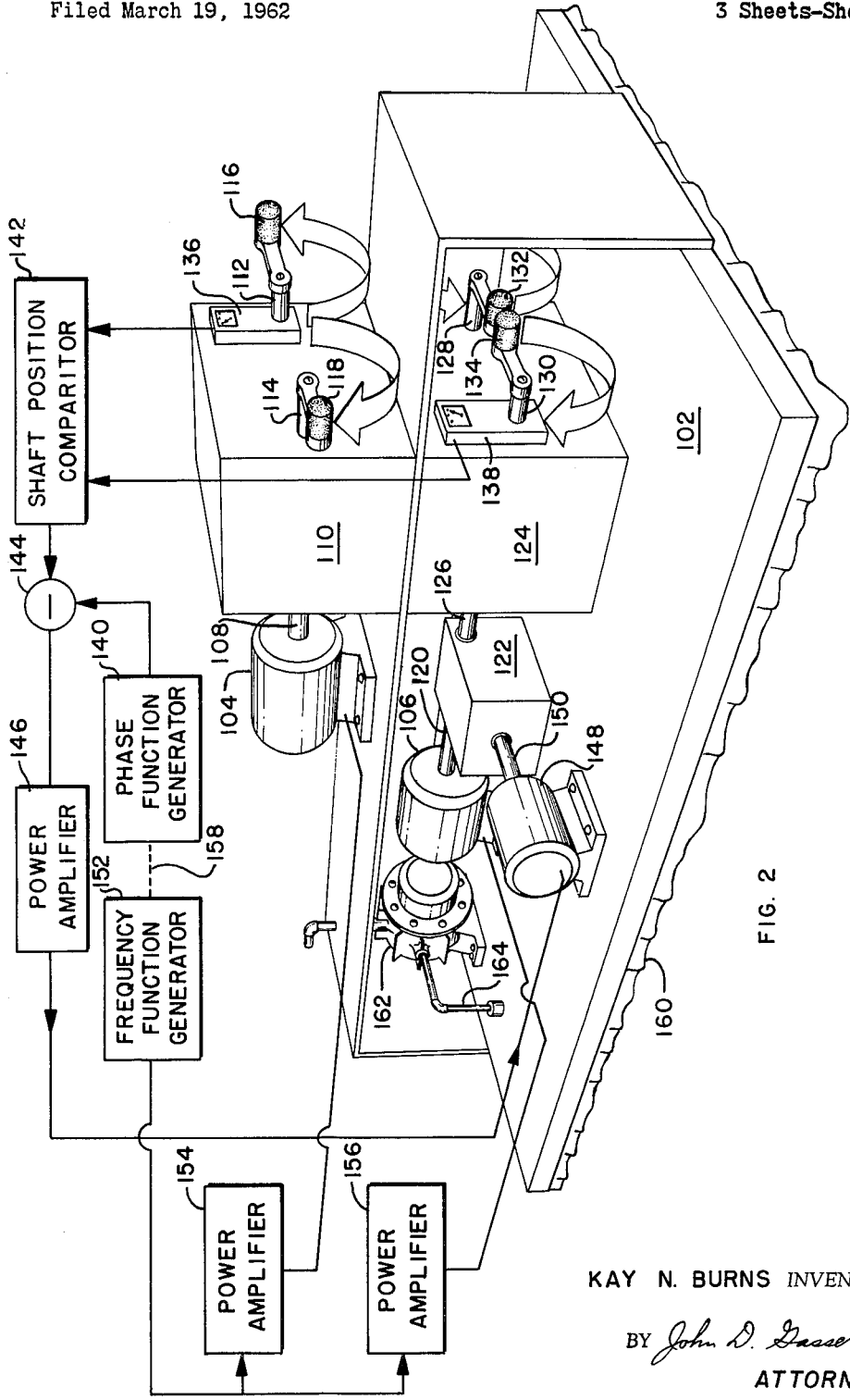
FIG. 2 illustrates another embodiment of this invention.

Attention will now be directed to FIG. 2 which illustrates another embodiment of the invention. Illustrated thereon is a rigid platform or frame 102. Supported from platform 102 are motors 104 and 106. The output shaft 108 of motor 104 drives a gear box 110. Suitable gears are provided in gear box 110 for converting the rotation of the motor 104 to rotate output shafts 112 and 114 of gear box 110 in opposite directions upon rotation of shaft 108. Such gearing arrangements are well-known or apparent to those skilled in the art. Eccentric weight 116 is mounted on shaft 112 and eccentric weight 118 is mounted on shaft 114. The eccentric weights are mounted on these two shafts in such a manner as to cause cancellation of horizontal components of centrifugal forces. Shafts 112 and 114 are thus arranged to be substantially parallel to each other and to the base platform 102. The plane of rotation of eccentric weight 116 should be substantially the same as the plane of rotation of weight 118.

Motor 106 has power output shaft 120 which is connected to a differential gear box 122. Differential gear box 122 is connected to a gear box 124 by shaft 126. Gear box 124 has two output shafts 128 and 130 upon which are mounted eccentric weights 132 and 134 respectively. Gear box 124, shafts 128 and 130, and weights 132 and 134 are similar to gear box 110, shafts 112 and 114, and eccentric weights 116 and 118 respectively. The eccentric weights on the two opposite pairs of counter-rotating weights are of the same mass. Gear box 10 is mounted substantially vertically above gear box 124; thus the individual forces produced by each set of counter-rotating weights will not produce a torque or couple on base plate 102. Mounted on shafts 112 and 130 are shaft indicators 136 and 138 respectively. Shaft indicators 136 and 138 and shaft position comparator 142 are of a character to put out a voltage proportional to the shaft position difference between shafts 136 and 138. For example, shaft position comparator 142 can be a commercially available phase meter working on sinusoidal inputs from elements 136 and 138 which in such example can be sinusoidal generators.

Shaft indicators 136 and 138 and shaft position comparator 142 are used with phase function generator 140 to assure that the phase of the two pairs of counter-rotating weights are following the output of the phase function generator. The outputs of shaft indicators 136 and 138 are fed to shaft position comparator 142 which has an output signal representative of the difference in phase of shafts 112 and 130. The output of comparator 142 is fed to a difference circuit 144 to which also is fed to the output of phase function generator 140. The output of difference circuit 144 is fed to a power amplifier 146 whose output drives motor 148. Motor 148 has a drive shaft 150 which is used to position differential gear box 122.

A frequency function generator 152 is provided to have an output $f_0(t)$. The output of the frequency generator 152 is fed to power amplifiers 154 and 156. The output of power amplifier 154 drives motor 104 and the output of power amplifier 156 drives motor 106.

It is believed that the operation of the device in FIGURE 2 is apparent from the prior discussion. Briefly, the frequency function generator is designed to have the output $f_0(t)$ as desired with time such as that indicated in FIG. 5. Phase function generator 140 is designed to have an output having a desired envelope such as envelope 96 as discussed hereinbefore in regard to FIG. 6. Phase function generator 140 and frequency function generator 152 are provided with means 158 for simultaneously starting the phase function generator and the frequency function generator so that the frequency and phase change timewise as selected.

As the frequency of the output of function frequency generator 152 varies, the speed of motors 104 and 106 likewise varies. The rate of rotation of motors 104 and 106 remain equal to each other. Thus counter-rotating weights 116 and 118 revolves at the same rate of speed as counter-rotating weights 132 and 134.

Simultaneously with the beginning of the output of the frequency function generator, the phase function generator 140 likewise has its output initiated. The outputs from shaft indicators 136 and 138 are connected to shaft position comparator 142. If the shafts are in phase, then the output from shaft position comparator 142 is zero, and there is no output from power amplifier 146. Thus motor 148 is idle, i.e. its shaft position does not change. If the phase function generator 140 indicates a different shaft position than zero, then there is an output from difference circuit 144 which goes to power amplifier 146 which acts to drive motor 148 which in turn drives differential gear 122. Gear 122 is driven then until the output from shaft position comparator 142 is equivalent to the output of the phase function generator 140.

The base 10 of FIG. 1 and the base 102 of FIG. 2 should be coupled to the ground. This can be done a number of ways. For example, the mass of the plates and the components can be sufficient to hold the apparatus firmly to the ground. Another way of accomplishing this is to provide an apron 160 about the base of base plate 102. The apron can be rubber, neoprene, or the like. A vacuum pump 162 is provided. A conduit 164 extends down through the plate and connects the vacuum pump 162 with the underneath side of base plate 102. By putting a slight vacuum underneath the plate, the downward pressure of the atmosphere will tend to hold the plate firmly against the earth. Also, a large mass can be supported above and from base 102 by resilient means. The mass and springs are so selected that the resonant frequency is less than the frequencies to be generated by the seismic source. Thus a static downward force can be exerted on the seismic generator but not influence its dynamic response.

There are many advantages of using the system disclosed herein. For example, the frequency changes can be arranged in any manner desired so as to aid in autocorrelation. If at the same time it is desired that certain frequencies be given greater weight than others, then the phase function can be adjusted to change the envelope accordingly. Thus one can emphasize selected frequencies by making the envelope relatively "bigger" during the time those selected frequencies are being generated.

While there are above disclosed but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. A seismic waveform generator comprising in combination: a first pair of similar rotatable eccentric weights having substantially parallel axes in a horizontal plane; a second pair of similar rotatable eccentric weights having substantially parallel axes in a horizontal plane; drive means to counter-rotate each pair of rotatable eccentric weights at the same frequency; first means to control the frequency of said drive means in accordance with a first variable function; second means to vary the phase of the angular position of said first pair with respect to said second pair of eccentric weights in accordance with a second variable function simultaneously with the frequency function of said first means; and a rigid base member rigidly supporting the axis of rotation of each eccentric weight.

2. A mechanical balanced modulator for imparting a seismic waveform into the earth which comprises in combination: a first pair of counter-rotating weights; a second pair of counter-rotating weights; a rigid base; means to support said first pair and said second pair of counter-rotating weights from said base; a frequency function generator for generating a variable output frequency function; means to rotate said two pairs of rotating weights at a frequency variable in accordance with the output of said frequency function generator; a phase function generator for generating a variable output phase function; and means to vary the phase of the angular position of said two pairs of counter-rotating eccentric weights in accordance with the output of said phase function generator while each pair is rotating at a frequency in accordance with the output of said frequency function generator.

3. A seismic waveform generator comprising in combination: a motor; means to control the rate of rotation of said motor in accordance with the frequency function $f_0(t)$; a first pair of counter-rotating weights arranged to be driven by and in phase with the rotation of said motor; a second pair of counter-rotating eccentric weights; shaft means between said second pair of eccentric weights and said motor to drive said second pair at the same frequency of rotation as the rotation of said motor, said shaft means including two shaft sections; a phase function generator; a controllable differential means connecting said two shaft sections; and means to control said differential means in accordance with the output of said phase function generator.

4. A seismic waveform generator comprising:
a base member which is essentially impermeable to air;
two pairs of rotatable eccentric weights, each weight of each pair being rotatable about one of a pair of horizontal, parallel axes which are rigidly connected to said base member;
means for rotating the eccentric weights of each pair counter to each other;
means for controlling the rotation of each pair of eccentric weights so that the weights rotate at the same frequency;

means to vary the phase between the angular position of the eccentric weights of one pair with respect to the other pair while each such pair are rotating at essentially the same frequency; and means for resisting upward movement of said base member from the surface of the earth, including means to seal the edges of said base member with the surface of the earth, and means for generating a partial vacuum between said base member and the surface of the earth.

References Cited by the Examiner

UNITED STATES PATENTS

| | | | |
|---|---|---|---|
| 1,943,076 | 1/1934 | Jackson | 74—61 |
| 2,188,482 | 1/1940 | Parks | 74—61 |
| 2,745,507 | 5/1956 | Bodine | 181—.5 |
| 2,749,097 | 6/1956 | Billner | 248—206 X |
| 2,771,593 | 11/1956 | Straehl. | |
| 3,185,250 | 5/1965 | Glazier | 181—.5 |

FOREIGN PATENTS

| | | |
|---|---|---|
| 1,164,266 | 10/1958 | France. |
| 822,979 | 11/1951 | Germany. |

BENJAMIN A. BORCHELT, *Primary Examiner.*

CHESTER L. JUSTUS, SAMUEL FEINBERG,
*Examiners.*

A. E. HALL, W. C. ROCH, *Assistant Examiners.*